(12) United States Patent
Richter

(10) Patent No.: US 9,144,525 B2
(45) Date of Patent: Sep. 29, 2015

(54) MOTION ASSISTANCE SYSTEM FOR WHEELCHAIRS

(71) Applicant: Max Mobility, LLC, Antioch, TN (US)

(72) Inventor: Mark Richter, Nashville, TN (US)

(73) Assignee: Max Mobility, LLC., Antioch, TN (US)

( * ) Notice: Subject to any disclaimer, the term of this patent is extended or adjusted under 35 U.S.C. 154(b) by 0 days.

(21) Appl. No.: 14/053,047

(22) Filed: Oct. 14, 2013

(65) Prior Publication Data

US 2014/0262575 A1    Sep. 18, 2014

Related U.S. Application Data

(60) Provisional application No. 61/782,487, filed on Mar. 14, 2013.

(51) Int. Cl.
| | |
|---|---|
| *A61G 5/04* | (2013.01) |
| *B60B 19/00* | (2006.01) |
| *A61G 5/02* | (2006.01) |
| *A61G 5/10* | (2006.01) |

(52) U.S. Cl.
CPC .............. *A61G 5/047* (2013.01); *B60B 19/003* (2013.01); *A61G 5/02* (2013.01); *A61G 2005/1054* (2013.01); *A61G 2203/12* (2013.01)

(58) Field of Classification Search
USPC ........................................................ 180/68.5
See application file for complete search history.

(56) References Cited

U.S. PATENT DOCUMENTS

| | | | |
|---|---|---|---|
| 3,905,437 A | 9/1975 | Kaiho et al. | |
| 4,386,672 A | 6/1983 | Coker | |
| 4,652,026 A * | 3/1987 | Byrge ........................ | 280/250.1 |
| 4,759,418 A | 7/1988 | Goldenfeld et al. | |
| 5,222,567 A | 6/1993 | Broadhead et al. | |
| 5,234,066 A | 8/1993 | Ahsing et al. | |
| 5,244,051 A | 9/1993 | Wu | |
| 5,366,037 A | 11/1994 | Richey | |
| 5,494,126 A | 2/1996 | Meeker | |
| 5,555,949 A | 9/1996 | Stallard et al. | |
| 5,651,422 A | 7/1997 | Casali | |
| 5,818,189 A | 10/1998 | Uchiyama | |
| 5,878,829 A | 3/1999 | Kanno et al. | |

(Continued)

OTHER PUBLICATIONS

Lutin. Smart Drive Power Assist Wheel DEMO. YouTube. Oct. 23, 2012. Retrieved from internet: <URL:http://www.youtube.com/watch?v=3RbaFns4iXQ>.

(Continued)

*Primary Examiner* — Jeffrey J Restifo
*Assistant Examiner* — Erez Gurari
(74) *Attorney, Agent, or Firm* — McAndrews, Held & Malloy, Ltd.

(57) ABSTRACT

The presently disclosure describes a motion assistance system for a wheelchair, for example, a powered drive wheel system that can continually drive a wheelchair in a circular or elliptical path. The motion assistance system comprises a mounting mechanism attachable to one or more structural elements of the wheelchair, and a drive linkage pivotable with respect to the mounting mechanism. A drive wheel can be mounted to an end of the drive linkage such that the drive wheel contacts the ground when installed on the wheelchair. The drive wheel comprises a plurality of lateral rollers positioned radially about the circumference of the power drive wheel. The lateral rollers can rotate about an axis tangential to the circumference of the drive wheel in order to facilitate driving the wheelchair in a radial direction.

23 Claims, 13 Drawing Sheets

(56) References Cited

U.S. PATENT DOCUMENTS

| | | | |
|---|---|---|---|
| 5,927,414 A | 7/1999 | Kan et al. | |
| 6,059,060 A | 5/2000 | Kanno et al. | |
| 6,112,837 A | 9/2000 | Kanno et al. | |
| 6,230,831 B1 | 5/2001 | Ogata et al. | |
| 6,290,014 B1 | 9/2001 | MacCready, Jr. | |
| 6,302,226 B1 | 10/2001 | Kanno et al. | |
| 6,354,390 B1 | 3/2002 | Uchiyama et al. | |
| 6,459,962 B2 | 10/2002 | Ulrich et al. | |
| 6,702,051 B2 | 3/2004 | Chu et al. | |
| 6,729,421 B1 | 5/2004 | Gluck et al. | |
| 6,729,422 B2 | 5/2004 | Chu et al. | |
| 6,807,465 B2 | 10/2004 | Ulrich et al. | |
| 6,860,347 B2 | 3/2005 | Sinclair et al. | |
| 6,880,661 B1 | 4/2005 | Oh | |
| 7,383,904 B2 | 6/2008 | Wu | |
| 7,425,007 B2 * | 9/2008 | Johannes de Kruijf | 280/250.1 |
| 7,566,102 B2 * | 7/2009 | Guile | 301/5.23 |
| 7,832,515 B2 | 11/2010 | Barthelt | |
| 8,413,749 B2 | 4/2013 | Hsu | |
| 8,430,189 B2 * | 4/2013 | Tallino | 180/11 |
| 8,602,138 B2 | 12/2013 | Filkoski et al. | |
| 2002/0171559 A1 * | 11/2002 | Yang | 340/825.69 |
| 2007/0261897 A1 | 11/2007 | Torita | |
| 2008/0066974 A1 | 3/2008 | Pearlman et al. | |
| 2009/0194974 A1 * | 8/2009 | Smith | 280/647 |
| 2011/0214929 A1 | 9/2011 | Filkoski et al. | |
| 2012/0080243 A1 | 4/2012 | Mulhern | |
| 2013/0008732 A1 * | 1/2013 | Richter | 180/167 |
| 2013/0240271 A1 * | 9/2013 | Tallino | 180/11 |

OTHER PUBLICATIONS

International Search Report and Written Opinion of International Search Authority, PCT/US2014/010819, Mailed May 12, 2014.
Office Action in U.S. Appl. No. 13/543,598 mailed Oct. 1, 2014.
Amendment in U.S. Appl. No. 13/543,598 filed on Jun. 18, 2014.
Office Action in U.S. Appl. No. 13/543,598 mailed Dec. 19, 2013.

* cited by examiner

MOTION ASSISTANCE SYSTEM FOR WHEELCHAIRS

RELATED APPLICATIONS

This application makes reference and claims priority to U.S. Provisional Patent Application No. 61/782,487, filed Mar. 14, 2013, by Mark Richter, titled "Motion Assistance System For Wheelchairs". U.S. Provisional Patent Application No. 61/782,487 is hereby incorporated by reference in its entirety.

BACKGROUND

Manual wheelchairs are the primary mode of locomotion for millions of people around the world. Upper limb pain and injury is very common among these manual wheelchair users and can severely impact mobility, independence and quality of life. The most common types of injury are impingement syndrome of the shoulder and carpal tunnel syndrome of the wrist. Upper limb pain and injury is an emotionally, physically and financially costly problem.

Wheelchair propulsion is one activity that has been associated with the development of these upper extremity injuries. It is recommended that users reduce how hard they push on the handrim and to do it less frequently in order to reduce the stresses of propulsion on the upper body.

Power attachment units can mount to manual wheelchairs to assist in propulsion. An example of one such power add-on is disclosed in U.S. Pat. No. 4,759,418, which is incorporated herein by specific reference for all purposes, employs a linkage system that mounts to the wheelchair frame and trails in between the two rear wheels. An electric motor powers a drive wheel that is controlled by a push button located within reach of the user. This type of design, not common to all power attachments, also employs a steering bar that attaches to the front casters in order to guide the wheelchair when being driven by the power add-on. These electric drive attachments are known to be successful in helping to reduce the physical effort needed for propulsion. A drawback is that these types of systems completely eliminate the need for pushing because the user drives the wheelchair, rather than maneuvers it through pushes. In this situation, the user does not benefit from the physical exercise of manual propulsion or the psychological benefits of not being dependent on the device for transportation.

Another example of a power attachment device is a push activated power assist wheels. These combine the benefits of manual push operation by the user and power assistance to reduce the demand on the user's upper extremities during propulsion. Push activated power assist wheels, similar to those disclosed in U.S. Pat. No. 5,818,189, which is incorporated herein by specific reference for all purposes, are battery powered wheels that employ either force and torque sensors, or both, to measure the force applied to the handrims from the user and amplify that force through the use of motors embedded in the wheels to drive the wheelchair forward or backward. This technology has been shown to have a number of positive effects on wheelchair users, including reduced energy expenditure, reduced push cadence, reduced muscle activation, decreased range of motion, easier hill climbing, increased propulsion speed and reduced pain during propulsion for those users already experiencing pain.

The drawback with this approach is that the employment of force and torque sensors to recognize and quantify the amplitude of the push significantly complicates the design. The handrims must be mounted to the wheel hubs, instead of the wheel rim as in typical manual wheelchairs, causing a significant increase in complexity. Added cost and weight of these devices then becomes inherent when this type of approach is taken. Additionally, because measurements are focused on the handrim, hazardous situations can be escalated by the assistive power. Accordingly, there is a need for power assist system that addresses the issues of these devices.

Another drawback with power attachment devices is that it the power attachment wheels can be difficult to maneuver the wheelchair around chairs. For example, a typical wheel is capable of only moving in one dimension (i.e., forward and backward). When a wheelchair is forced around a turn, however, the power attachment wheel will be moving in a radial direction. This can cause added friction between the wheel and the ground on turns, thereby making maneuverability more difficult. Accordingly, there is a need for a motion assistance system for wheelchairs that provides a power drive wheel that can drive a wheelchair in a radial direction.

SUMMARY

The present disclosure describes a motion assistance system for a wheelchair. In certain aspects, the motion assistance system comprises a mounting mechanism that can be attachable to one or more structural elements of the wheelchair. The motion assistance system can also include a drive linkage that is pivotable, or capable of pivoting, with respect to the mounting mechanism. The motion assistance system also comprises a drive wheel mounted to an end of the drive linkage. In this manner, the drive wheel contacts the ground when it is installed on the wheelchair. The drive wheel comprises a plurality of lateral rollers positioned radially about the circumference of the power drive wheel. The lateral rollers are rotatable about an axis tangential to the circumference of the drive wheel. This can facilitate the motion assistance system to drive a wheelchair in a radial direction. For example, in certain embodiments of the present technology the power drive wheel is capable of continually driving a wheelchair in a circular or elliptical path.

Certain aspects of the present technology provide a motion assistance wheelchair. For example, certain embodiments include a wheelchair having a seat and at least two rear wheels. The wheelchair can include a mounting mechanism that is attached, or attachable to one or more structural elements of the wheelchair. The wheelchair can also include a drive linkage that is pivotable with respect to the mounting mechanism. In certain embodiments, a drive wheel can be mounted to an end of the drive linkage such that the drive wheel contacts the ground when installed on the wheelchair. The drive wheel can comprise a plurality of lateral rollers, which can be positioned radially about the circumference of the power drive wheel. The lateral rollers can be rotatable about an axis tangential to the circumference of the drive wheel in order to facilitate driving of the wheelchair in a radial direction, for example.

Certain aspects of the present technology provide a motion assistance system for driving a wheelchair. The system can include, for example, a mounting mechanism comprising an expanding connector bar. The mounting mechanism can be removably attachable to a wheelchair. For example, the mounting mechanism can be attached to a structural element of a wheelchair, such as a wheel axle. The motion assistance system can also include a drive linkage that is pivotable with respect to the mounting mechanism, and a drive wheel mounted to an end of the drive linkage such that the drive wheel makes contact with the ground when installed on the wheelchair. The drive wheel comprises a plurality of lateral rollers positioned radially about the circumference of the power drive wheel. The lateral rollers can be rotatable about an axis tangential to the circumference of the drive wheel to facilitate lateral movement of the drive wheel while driving the wheelchair forward. In some aspects, the motion assistance system can include a motor for driving the drive wheel, and a remote control for controlling the motor. For example, the remote control can comprise a wrist band and an activation button positioned at an inner wrist location of the wrist band.

DETAILED DESCRIPTION

The presently disclosed technology relates generally to a motion assistance system for manual wheelchairs. More specifically, the present technology relates to a feature that employs a wheel, for example, that is configured to move sideways and/or laterally. In certain embodiments, the present technology can operate with a system that employs motion-based sensing for recognition of user breaking and a smart drive feature for such a power assist system that assists in the mobility of a power assist driven wheelchair.

In certain embodiments, the presently described motion assistance system can operate in connection with a motion-based power assist system, for example, the system described in U.S. patent application Ser. No. 13/543,598 ("the '598 application"), which is hereby incorporated by reference in its entirety. However, the motion assistance system can also operate in connection with a wheelchair that is not equipped with a motion-based power assist system.

The motion assistance system can include a drive wheel or a power drive wheel (e.g., a drive wheel including a motor) that makes contact with the ground, and a mounting mechanism 140 (also referred to herein as a mounting attachment or a hitch) that clamps to an axle bar of the wheelchair. The motion assistance system can also include a drive linkage, which can be pivotally attached to the wheelchair, for example, to a structural element, or to an axle or an axle bar of a wheelchair, through a mounting mechanism. In this manner, the power drive wheel can mount to a distal end of the drive linkage, and the mounting mechanism 140 can pivotally attach to the drive linkage on the opposite end of the power drive wheel. The present technology is explained in more detail below in connection with FIGS. 1-15.

Figure 1:
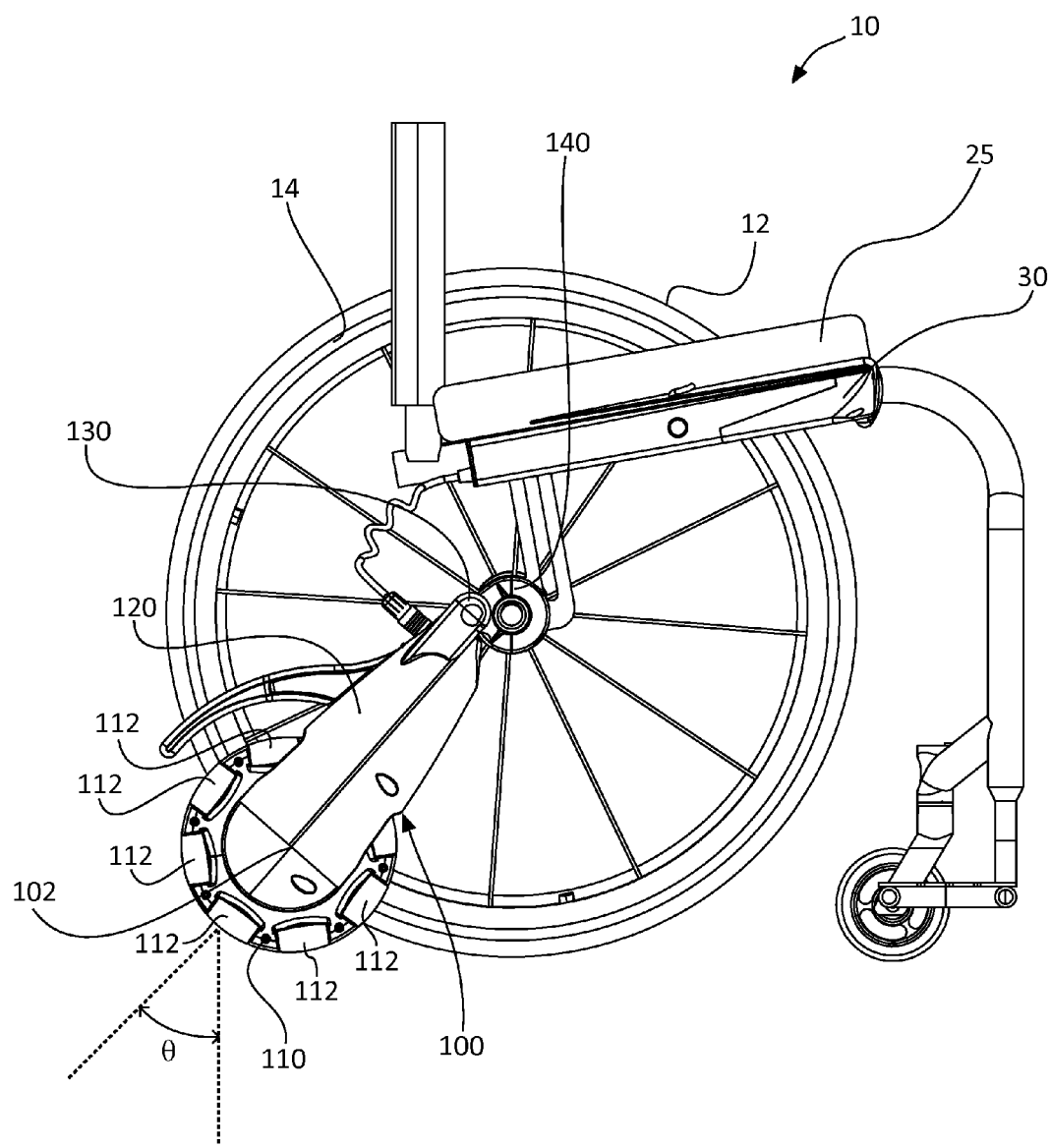
FIG. 1 shows a side view of a wheelchair equipped with a motion assistance system in accordance with at least one embodiment of the present technology.

FIG. 1 depicts the side view of a wheelchair 10 equipped with a motion assistance system 100 of the present technology. The motion assistance system 100 can include a drive unit 102, which can comprise a drive wheel 110 and a drive linkage 120, for example. The drive unit 102 can be a power drive wheel, for example, that includes a motor for driving the drive wheel forward and/or backward. The drive unit 102 can include a motion-based power assist system such as the system disclosed in the '598 application, for example.

The drive wheel 110 is pivotally mounted to a drive linkage 120 so that the drive wheel 110 can rotate freely to maintain traction while driving the wheelchair 10. In certain embodiments, the drive linkage 120 and/or the drive wheel 110 can comprise a motor, for example, an electric motor, that drives the drive wheel 110 and, in turn, the wheelchair 10. The drive linkage 120 can attach to a mounting mechanism 140 (e.g., a mounting attachment or a hitch), which can be attachable to one or more structural elements of a wheelchair. In certain embodiments described herein, the drive linkage 120 can be attachable and detachable from the mounting mechanism 140 via a hinge, for example. In turn, the mounting mechanism 140 can be clamped to a support bar, an axle bar, or an of the wheelchair 10.

The drive wheel 110 has side facing lateral rollers 112 that allow an operator to turn the wheelchair with relative ease using the pushrims 14 on the wheels 12 of the wheelchair 10 while the drive unit 102 is in normal operation. The angle θ of the drive linkage 120 with respect to vertical can vary in different embodiments and depending upon the specific use. However, in certain embodiments, the motion assistance system 100 can operate efficiently on a flat surface when the angle θ is about 40 degrees from vertical.

FIG. 1 also shows an extra battery 30, which can be a part of the motion assistance system used to power the drive unit 102, for example, the motor of the drive unit. The battery 30 can be installed, for example, at a location at, around, or under an armrest 25 of the wheelchair 10. In some embodiments, one or more batteries 30 can be installed or located at any position that allows for the battery 30 to be in an electrical connection with the drive unit 102, such that the battery 30 can power a motor of the power drive wheel.

Figure 2:
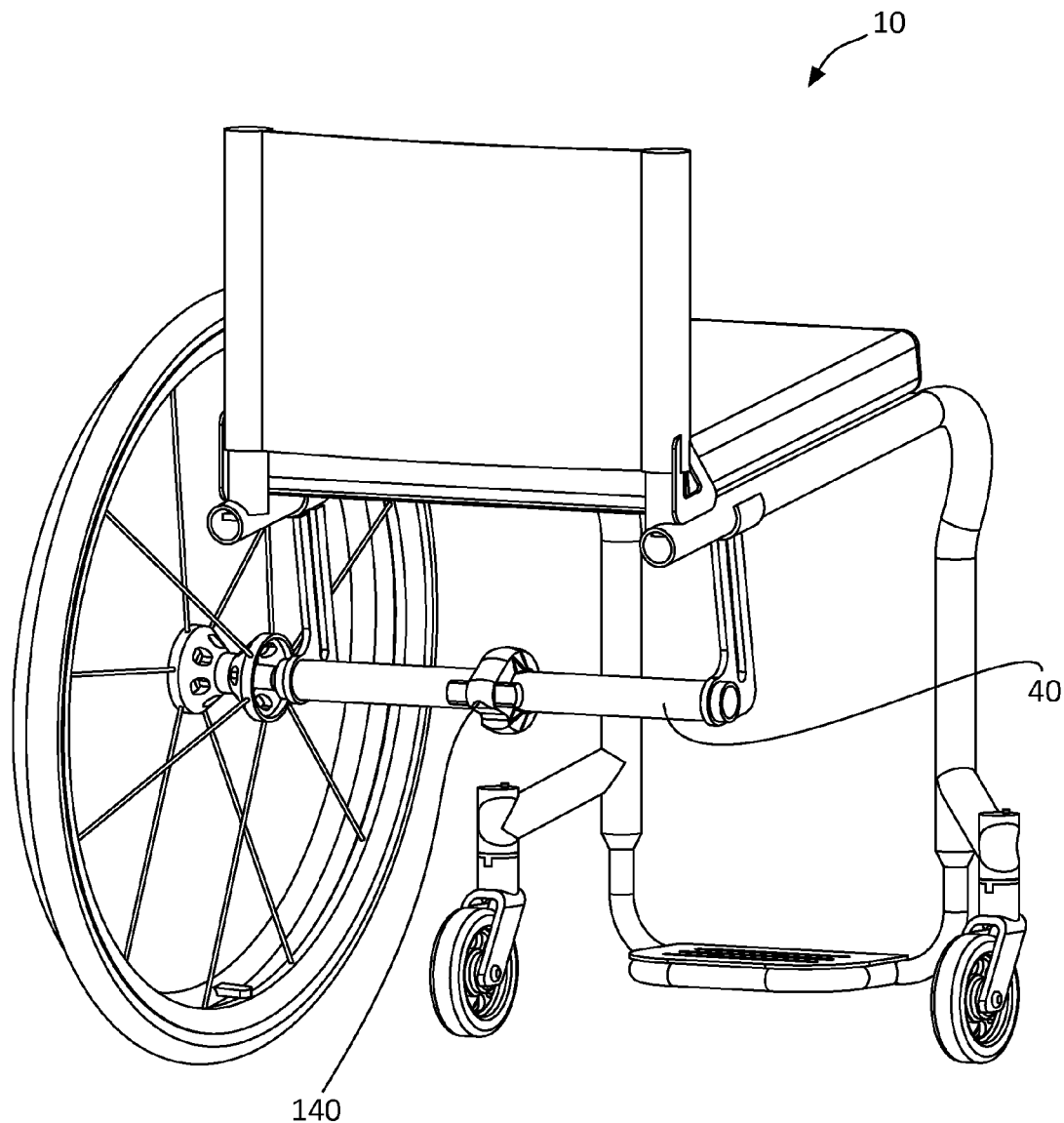
FIG. 2 shows a rear angled view of a wheelchair with the right wheel removed and a mounting mechanism for a motion assistance system.

FIG. 2 shows a rear angled view of a wheelchair 10 having the right wheel removed. The wheelchair 10 has a mounting mechanism 140 attached to a support bar 40 (or an axle bar or axle tube) of the wheelchair. The mounting mechanism 140 can be, for example, a hitch or other attachment device capable of clamping or otherwise attaching to a structural element of the wheelchair 10, and to a drive linkage 120 of a drive unit 102. As shown, the mounting mechanism 140 can be on an axle tube or on a linkage that spans across the side frames of a folding frame wheelchair. While this embodiment depicts a mounting mechanism that is separate from the drive unit 102, thereby allowing the drive unit 102 to attach to the wheelchair 10, it should be appreciated that in certain embodiments, the mounting mechanism 140 can be a part of the drive unit 102.

Figure 3:
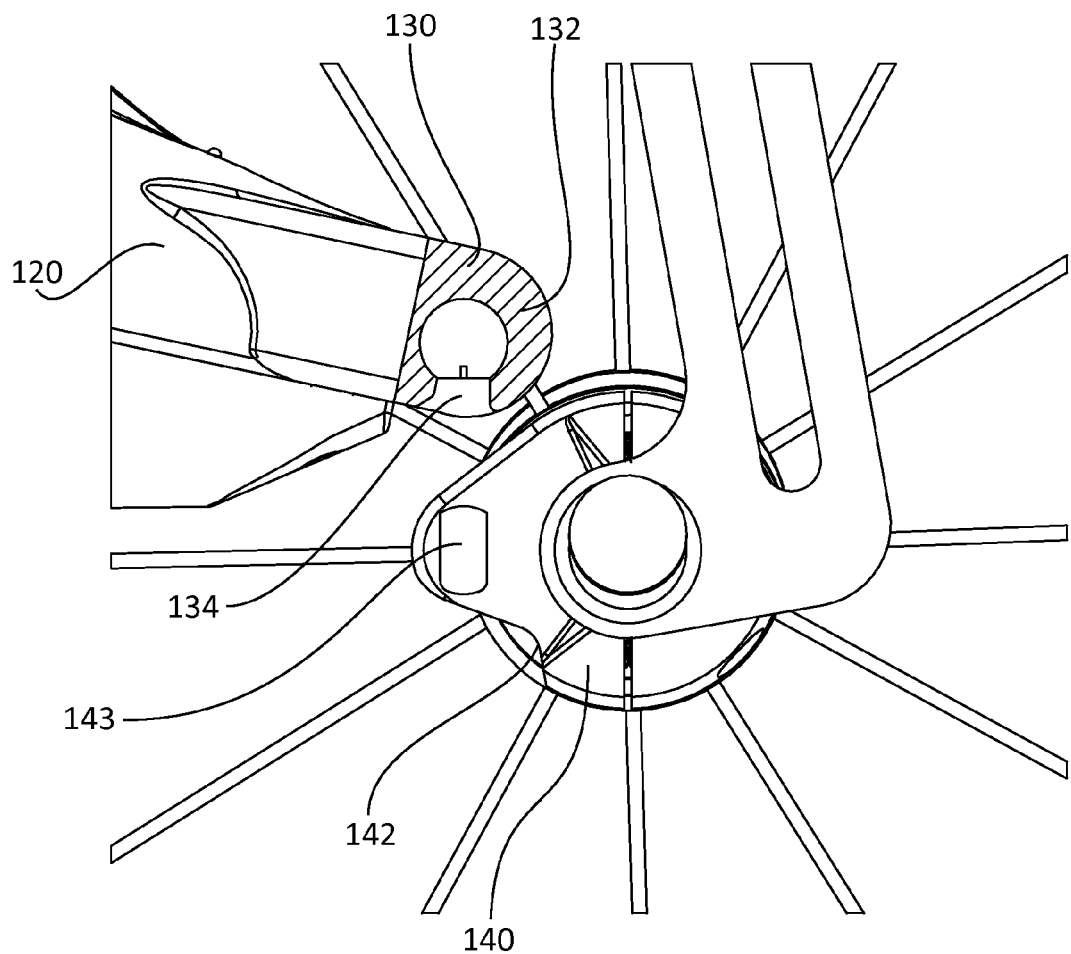
FIG. 3 shows a drive linkage of a motion assistance system attaching to a mounting mechanism of a wheelchair.
Figure 4:
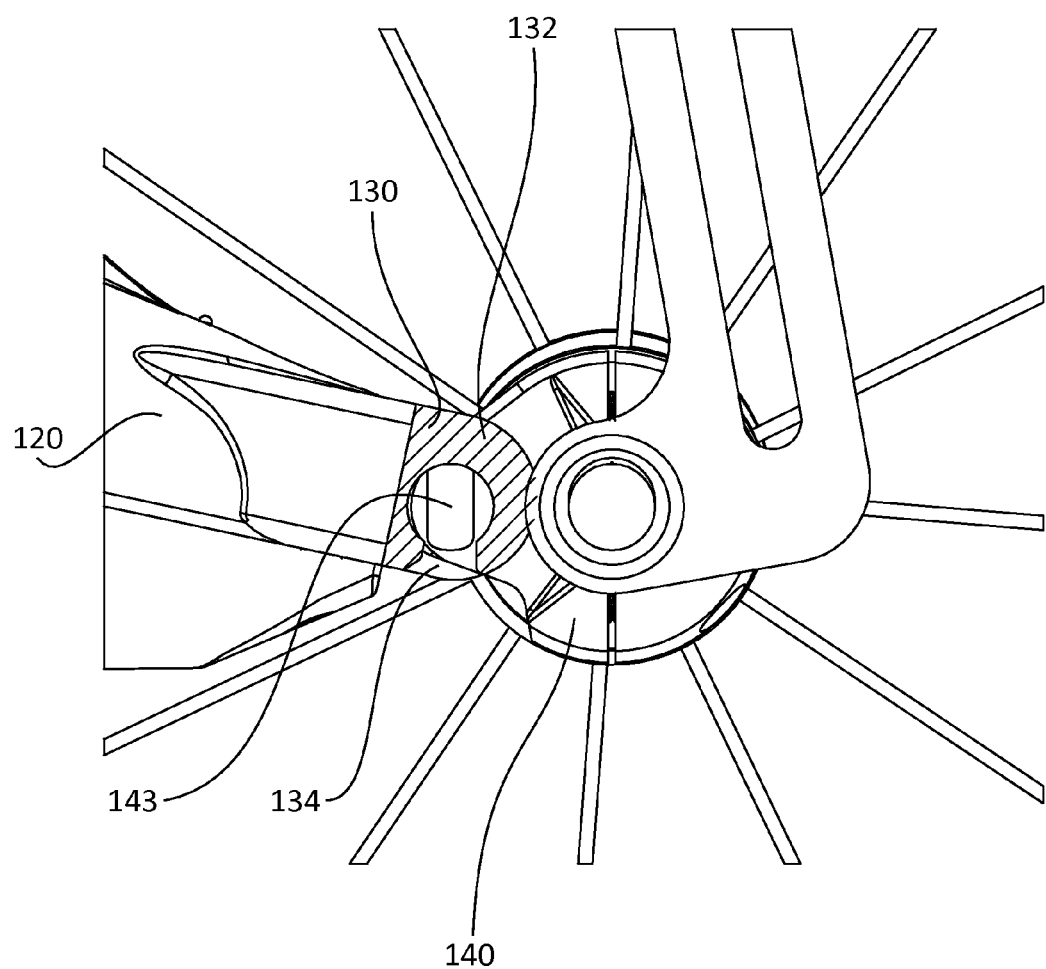
FIG. 4 shows a drive linkage of a motion assistance system attaching to a mounting mechanism of a wheelchair.
Figure 5:
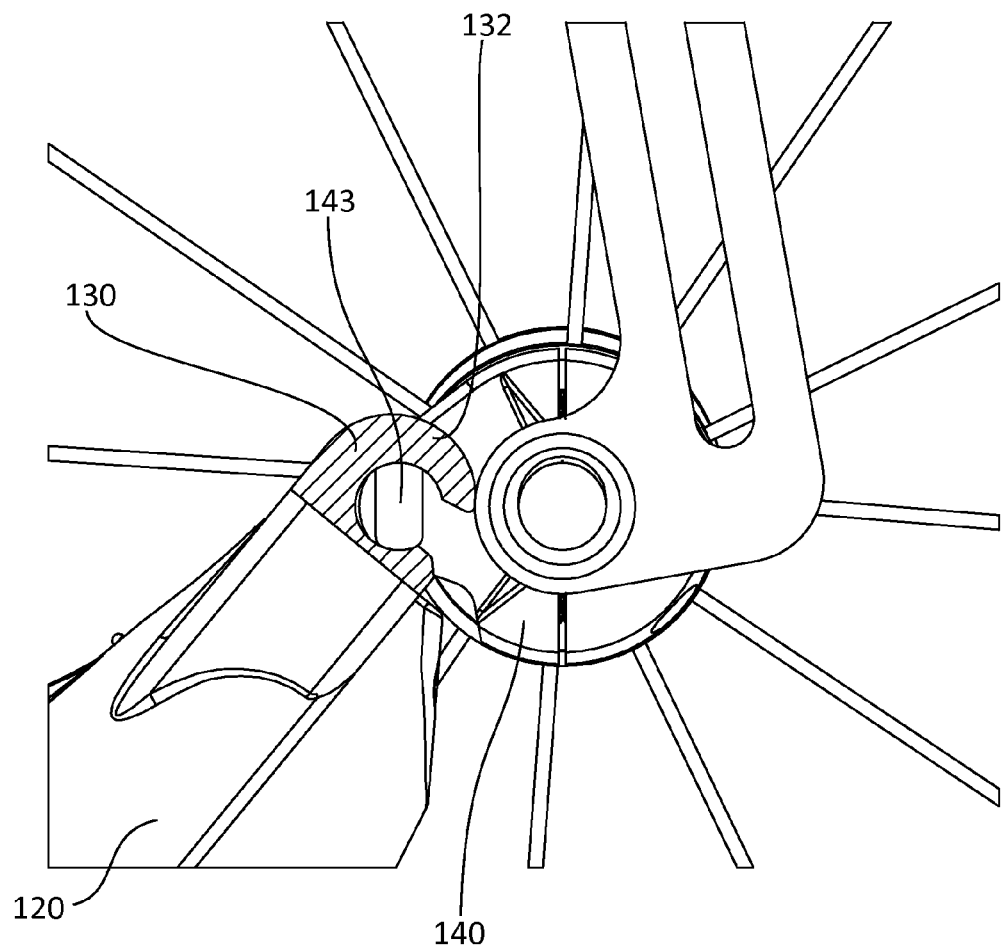
FIG. 5 shows a drive linkage of a motion assistance system attaching to a mounting mechanism of a wheelchair and angled downward.

FIGS. 3-5 demonstrate an example of how a drive linkage 120 of a drive unit 102 can attach to a mounting mechanism 140 (e.g., mounting mechanism 140 of FIG. 2) of a wheelchair. In FIG. 3 the drive linkage 120 approaches the mounting mechanism 140 at an angle that is approximately parallel with the ground, or angled such that the drive wheel 110 is higher than the mounting mechanism 140. The shape of the drive linkage unit interface 130, which can include a hook 132, allows the drive linkage 120 to be set onto the mounting mechanism 140. The mounting mechanism 140 can have a slot, bar, or other attachment mechanism adapted to mate and/or connect with the drive linkage unit interface. For example, the mounting mechanism 140 can have a connector bar 143 having round ends and with flat sides, adapted to be surrounded and/or grabbed by a hook 132. In some embodiments, the mounting mechanism 140 comprises a flat edge 142, which can help stop the drive unit from rotating under the wheelchair.

The drive wheel 110 (not shown in FIG. 3) can be mounted to the distal end of the drive linkage 120 so that the drive wheel 110 can make contact with the ground when the drive linkage is properly attached to the mounting mechanism 140. The drive linkage unit interface 130 can be equipped with a spring loaded clip 134 to close off the hook 132 when attached to the mounting mechanism 140 so as to prevent the hook 132 from unintentionally becoming detached from the mounting mechanism 140, for example.

FIG. 4 shows the drive linkage 120 lowered such that the drive linkage unit interface 130 engages with the mounting mechanism 140. More specifically, FIG. 4 shows the connector bar 143 of the mounting mechanism 140 surrounded by the hook 132 and the clip 134 of the drive linkage interface 130. As shown in FIG. 4, the drive linkage 120 is still approximately parallel with the ground or angled so that the drive wheel 110 is slightly higher than the mounting mechanism 140 after the initial connection.

FIG. 5 shows the drive linkage 120 rotated and effectively locked and/or positioned into place with respect to the mounting mechanism 140. While in place, however, the drive linkage 120 can rotate freely to maintain traction with the ground. FIG. 5 shows the drive linkage 120 rotated downwards such that the power drive wheel would be in contact with the ground.

As shown in FIGS. 1, 6-7, 10, and 13-15, the drive wheel 110 can include multiple lateral rollers 112 positioned radially about the circumference of the power drive wheel 110. The lateral rollers 112 can be rotatable about an axis that is tangential to the circumference of the drive wheel 110 such that, when the drive wheel 110 is placed on a surface, the drive wheel can freely slide in a direction parallel to the rotational axis of the drive wheel 110. Because the lateral rollers 122 rotate freely about an axis tangential to the circumference of the drive wheel 110, the drive wheel can sliding in a direction parallel to the center axis of the drive wheel 110 while in contact with the ground. The lateral rollers 112 can also provide traction between the drive wheel 110 and the ground when the drive wheel 110 is driving or rolling about the center axis of the drive wheel 110. In this manner, the drive wheel 110 can of drive the wheelchair forward by rotating about the center axis of the power drive wheel.

In certain embodiments, the motion assistance system 100 can be mounted to a wheelchair such that the drive wheel 110 contacts the ground midway between two wheels 12 of the wheelchair 10. The drive linkage 120 can be mounted and angled so that rotation of the drive wheel 110 creates increased traction with the ground when the drive wheel is powered (e.g., by a motor) to drive the wheelchair forward. In this manner, the lateral rollers 112 facilitate the drive wheel 110 to slide in a lateral direction while also driving the wheelchair 10 forward. Accordingly, with this feature, the motion assistance system 100 can be capable of continually driving the wheelchair 10 in a radial direction.

Figure 6:
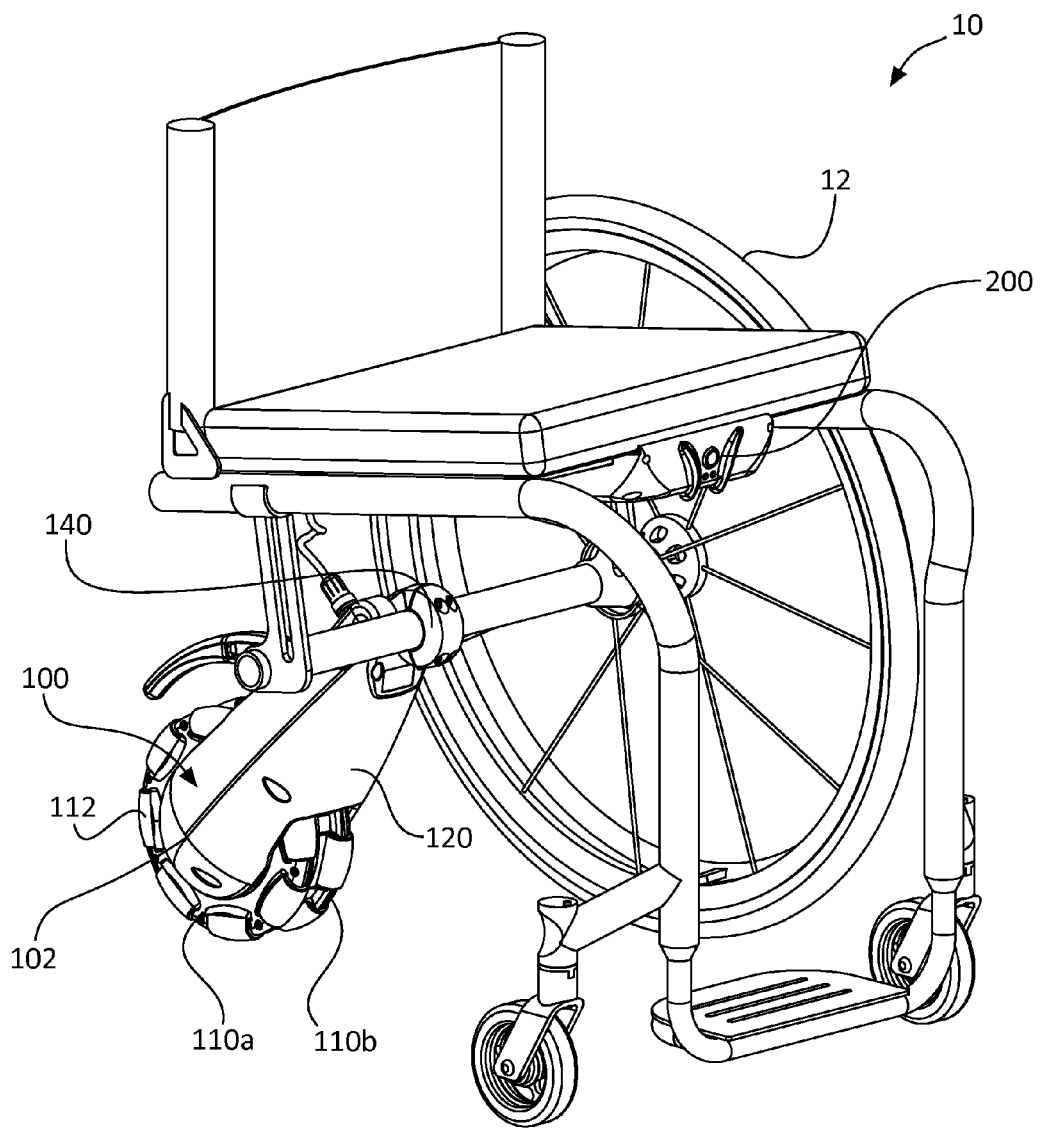
FIG. 6 shows a front angled view of wheelchair with the right wheel removed, the wheelchair equipped with a motion assistance system and a battery button interface.

The drive wheel 110 can include more than one wheel. For example, the drive wheel 110 can comprise two wheels (e.g., 110a and 110b as shown in FIG. 6), each wheel (110a and 110b) comprising a plurality of lateral rollers 112 about the circumference of the wheel 110. In certain embodiments, the lateral rollers 112 can be a cylindrical shape or a barrel shape. The lateral rollers 112 may have a length approximately two times larger than the diameter. The drive wheel 110 can include a different number of lateral rollers depending on the size, shape, and intended operation of the drive wheel 110 and/or the motion assistance system 100. For example, in certain embodiments, the drive wheel 110 can include eight or sixteen lateral rollers 112.

Figure 14:
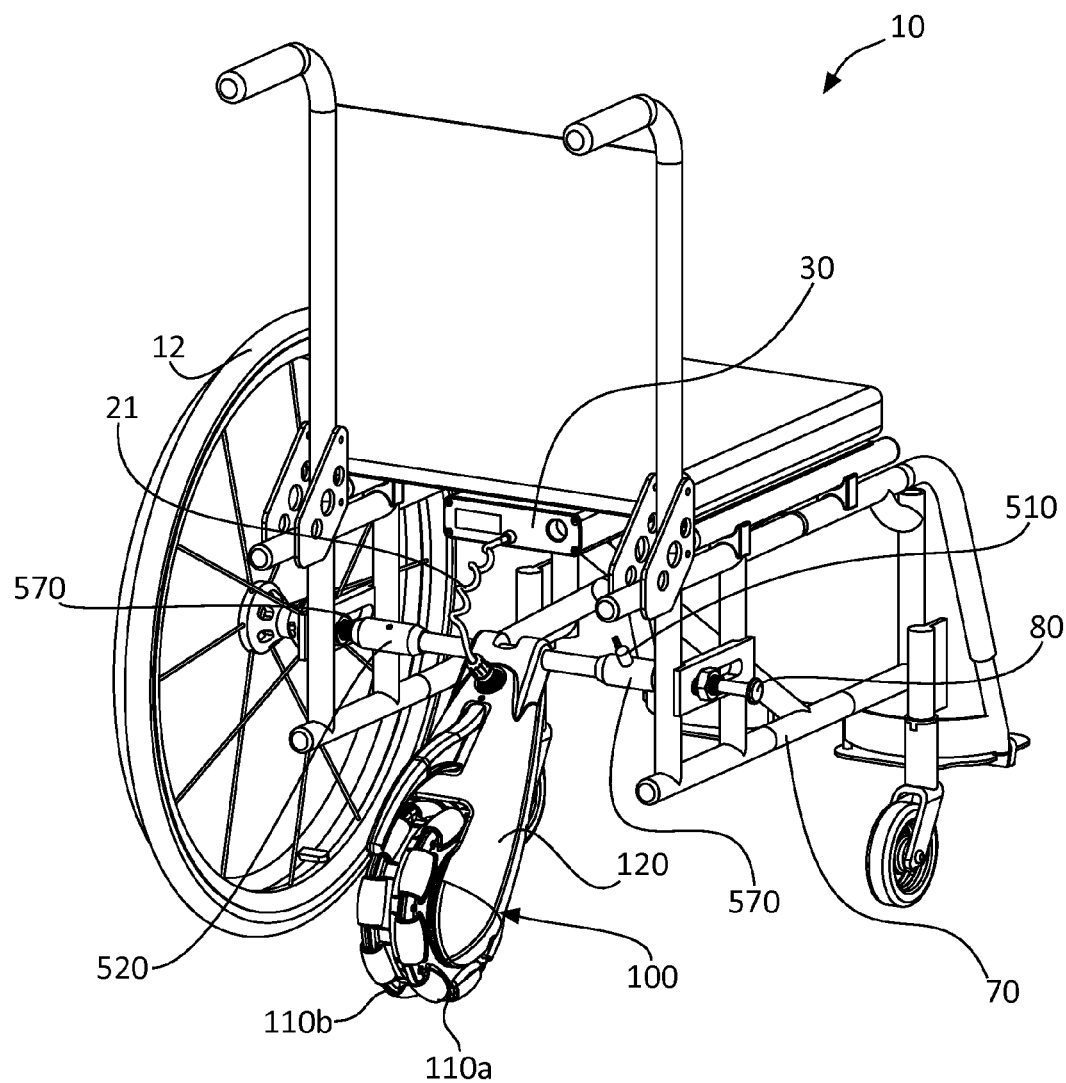
FIG. 14 shows a rear angled view of a wheelchair with the right wheel removed, the wheelchair having a motion assistance system attached by an expanding connector bar.
Figure 15:
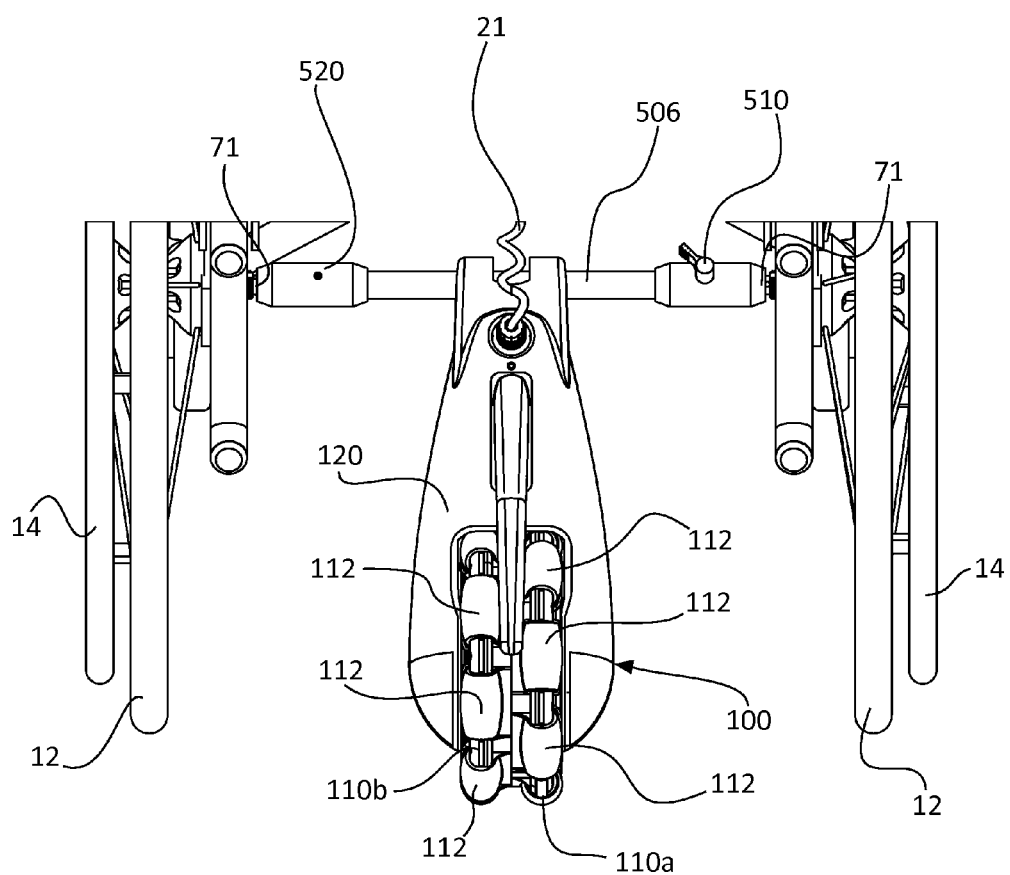
FIG. 15 shows a rear view of a wheelchair having a motion assistance system attached by an expanding connector bar.

The lateral rollers 112 can be arranged such that at least one lateral roller is in contact with the ground when the drive wheel 110 is in contact with the ground. For example, in some embodiments (e.g., as shown in FIGS. 6, 14, and 15), the drive wheel 110 can comprise two drive wheels (110a and 110b), each drive wheel having lateral rollers 112 spaced apart from one another to allow free rotation of the rollers. The two drive wheels 110a and 110b can be offset such that at least one lateral roller 112 from one of the wheels 110a or 110b is in contact with the ground regardless of the rotational position of the drive wheel 110. That is, in circumstances where the lowermost position of wheel 110a is an space between lateral rollers 112, then the lowermost position of wheel 110b will be a lateral roller 112 that is in contact with the ground.

The lateral rollers 112 can roll about an axis that is tangential to the circumference of the drive wheel 110. Because the lateral rollers 112 do not pivot about an axis perpendicular to the planar surface of the drive wheel 110, the lateral rollers 112 still provide traction when the drive wheel 110 is driving the wheelchair 10 forward. In this manner, when the drive wheel 110 is in contact with the ground, the lateral rollers 112 allow the wheel to slide in a lateral, or sideways direction, while at the same time allowing the drive wheel 110 to grip the ground with enough traction to drive the wheelchair 10 forward. This feature can aid in the mobility and maneuverability of a wheelchair equipped with a power assist system, as it can enable the system to continually drive the wheelchair 10 in a radial direction. For example, the motion assistance system 100 can allow a power assist system (e.g., a power assist system described in the '598 application) to drive the wheelchair 10 along a circular or elliptical path. This can help a user move a wheelchair 10 around a turn, or move along a track, for example.

Certain embodiments of the present technology also relate to a motion assistance system for driving a wheelchair using a control switch. For example, in certain embodiments of the present technology, a motion assistance system can drive the wheelchair by pressing a button, activating a switch, or pressing onto a throttle to accelerate or decelerate a wheelchair to a desired velocity. In this manner, the motion assistance system differs from a motion-based power assist system (e.g., the system of the '598 application) because the power assist is based on the activation of a switch, rather than the implementation of initial motion of the wheelchair. A user of the present motion assistance system can activate the system and then steer the wheelchair with his or her hands by applying pressure to the handrims of the wheelchair. Along these lines, the motion assistance system can effectively operate with the motion assistance system and the related power drive wheel with lateral rollers. That is, by applying pressure to the handrims of a wheel, the wheelchair will change angles, but because the power drive wheel can freely move laterally or sideways, the wheelchair can continue driving around a turn in a radial direction.

The motion assistance system can include a control switch located on or around the seat of the wheelchair. For example, FIG. 6 depicts a control switch 200, or a button, on the front of an extra battery. This control switch 200 can be used to directly control the motor of the drive unit 102. The control switch 200 may be located in the center of a front surface of the seat of the wheelchair 10. An operator can therefore press and/or hold the button of the control switch 200 to accelerate or decelerate the wheelchair 10 to a desired speed. By pressing the button of the control switch 200, the drive unit 102 can respond by accelerating or decelerating as instructed by the user.

The control switch 200 can utilize multiple control schemes. For example, in one control scheme, the operator can press and hold a button until a desired speed is reached, and then release the button to cruise at that speed. The wheelchair can then continue to cruise at that speed until the operator issues a command to change this, for example, by pressing the button again to momentarily turn off the motor. In another control scheme, control switch 200 can be configured to operate at a series of predetermined speeds. For example, while stationary, the user can press and hold the button to step up to the first speed step. The operator can continue to press the control switch 200 to step up the speed to various levels until a desired speed is reached. The operator can also press or hold the control switch for a certain time to turn off the motor.

Figure 7:
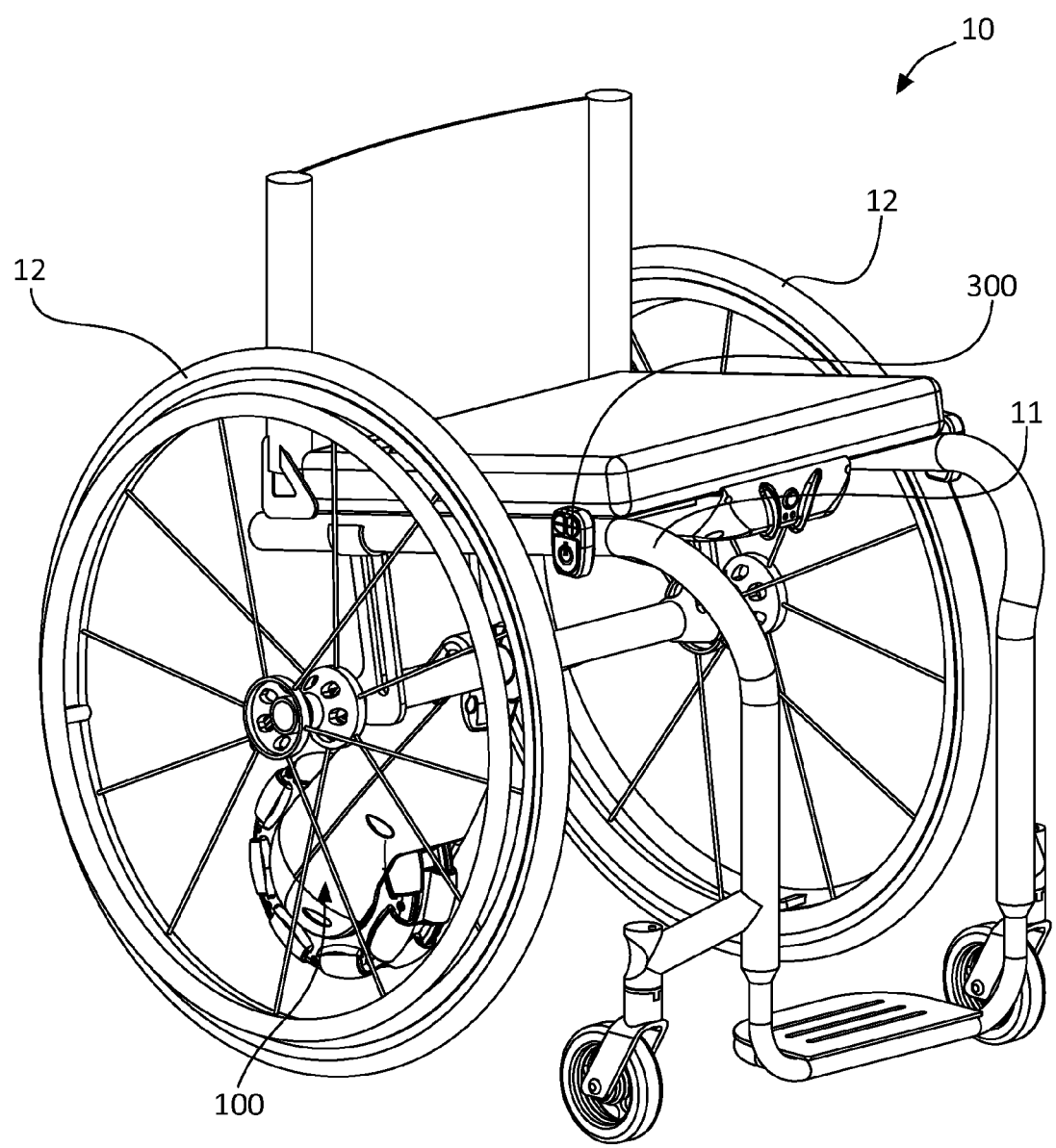
FIG. 7 shows a front angled view of a wheelchair equipped with a motion assistance system and a remote control interface.

In certain embodiments of the present technology, the control switch can be a remote control. For example, FIG. 7 depict embodiments of a remote control 300 mounted to a wheelchair 10 equipped with a motion assistance system 100 of the present technology. The remote control 300 can be mounted to a structural element or the frame of the wheelchair 10, for example, on the push handles 11 for easy operator access. The buttons on the remote control 300 can allow a user to start and stop the motor, and also to control the speed of the motor. For example, the remote control 300 may be equipped with +/− buttons to step the speed up or down. The buttons can also be configured so that a press can make a large speed change upwards or downwards.

Figure 8:
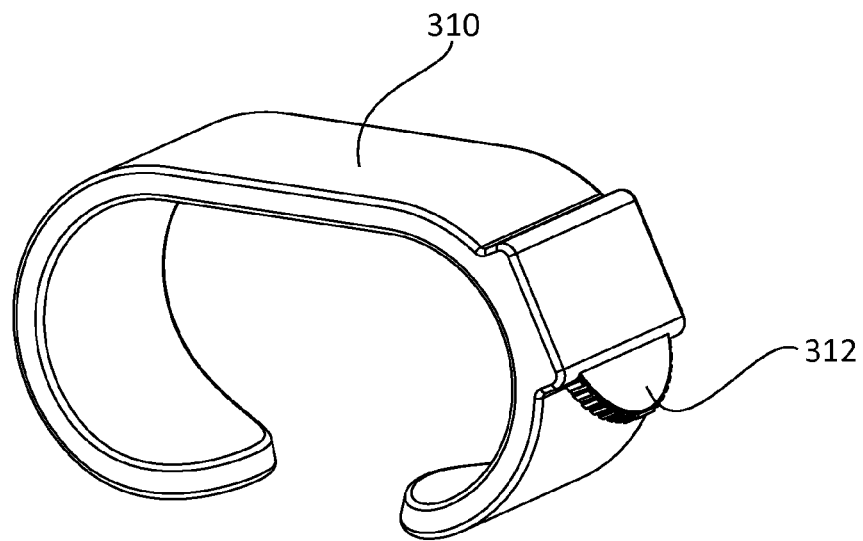
FIG. 8 shows a hand remote interface for use with a wheelchair with a motion assistance system.

In certain embodiments, the remote control can be equipped with a throttle that allows a user to set a more precise speed based on a control switch position. For example, FIG. 8 shows a hand remote control 310 that allows a user to directly control the speed of the drive unit 102 using a thumb throttle 312, which can be a 3-way control toggle rocker and push-in button, for example. This feature can allow a user to directly control the speed of the drive unit 102 while still being able to steer the wheelchair 10. For example, a user can set the thumb throttle 312 to a desired speed by rotating the thumb throttle in a clockwise/counterclockwise manner, and then press the throttle button 312 inwards to turn the motor off. The hand remote control 310 can be designed to attach to the armrest or other structural element of the wheelchair 10. The hand remote control 310 can also be designed to be held in, or wrap around the hand and/or one or more fingers of a user. The hand remote control 310 can come in a variety of sizes and shapes. For example, the hand remote control 310 can be a 2-finger band that comes in an extra-small, small, medium, large and extra-large size, depending on the size of the operator's hand.

Figure 9:
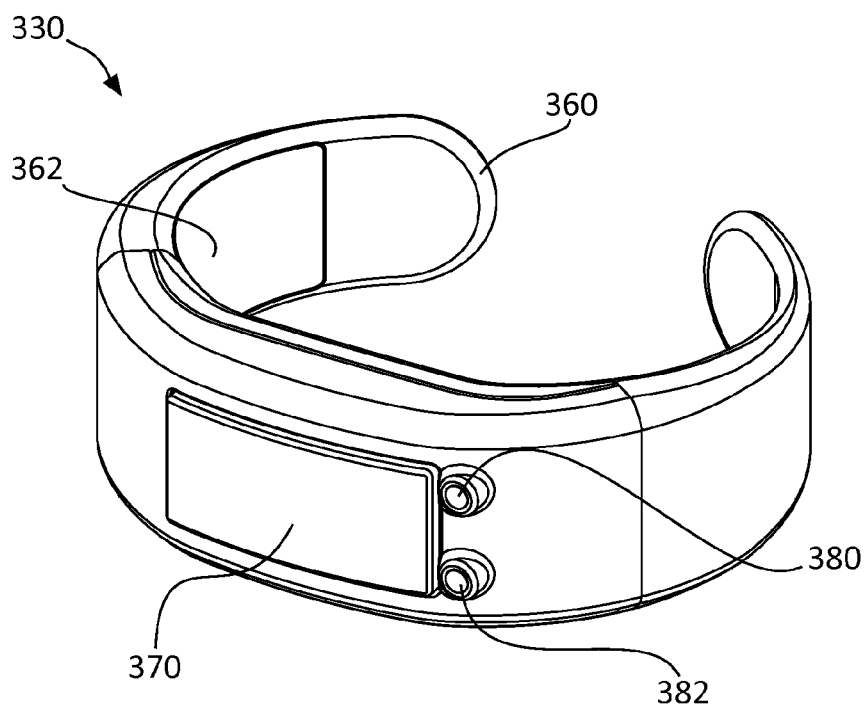
FIG. 9 shows a wrist remote control interface for use with a wheelchair with a motion assistance system

FIG. 9 shows another embodiment of a remote control 330 in accordance with an embodiment of the present technology. More specifically, FIG. 9 shows a wrist remote control interface 330 for use with a wheelchair 10 using a motion assistance system 100. The wrist remote control 330 can be worn on the wrist or forearm of a user, for example, and used to access different operating modes of a motion assistance or power assistance system. The wrist remote control 330 can comprise a band 360, which can comprise compliant plastic, for example, making the band 360 stretchable and/or bendable, to make it easy to put the wrist remote control 330 on and off. The band 360 can also have a non-slip portion 362 on an inner surface designed to keep the wrist remote control 330 from slipping out of position on the wearer. For example, the non-slip portion can comprise a material such as rubber that provides friction between the writ band 360 and the arm/wrist of a wearer without sacrificing comfort to the user.

The wrist remote control 330 can also comprise an activation button 370, which can be depressed to activate certain functionality of the motion assistance system. For example, the activation button 370 can be pressed to change the mode of a drive unit 102, to turn a motor on or off, or to adjust the speed of the drive unit 102, for example. The activation button 370 can be located at an inner wrist location on the band 360 so that a user can simply press that portion of the wrist against a structural element of the wheelchair to depress the button 370. In this manner, a user can activate the wrist remote control 330 without having to remove his or her hands from the wheels of the wheelchair, for example. In some embodiments, the wrist remote control 330 can be used to activate and/or deactivate a power assistance and/or motion assistance system; however, in some embodiments, the wrist remote control 330 can be used to only provide a single function, for example, to deactivate the drive unit 102, or as an emergency brake, for example.

The wrist remote control can also comprise one or more warning and/or status lights. For example, FIG. 9 shows a wrist remote control 330 with a status LED light 380, which can indicate a certain status of the wrist remote control 330 or the motion assistance system 100 controlled by the wrist remote control 330 for example. FIG. 9 also shows a wrist remote control 330 with a warning LED 382, which can indicate a low battery, a battery charging indicator, or an error signal, for example. In certain embodiments, the status/warning lights 380 and 382 can be different colors. For example, the status light 380 can be a green LED light, and the warning light 382 can be a red LED light. In certain embodiments, each of the lights 380 and 382 can take on two or more colors, for example, red, yellow, green, blue, orange, white, or purple. In some embodiments, the status/warning lights 380 and 382 can generate signals in the form of a blinking or flashing pattern as a way to distinguish between certain status or warning signals. For example, in some embodiments, warning light 382 can blink in a particular pattern to indicate one of a number of potential problems with the wrist remote control and/or the motion assistance system 100.

Figure 10:
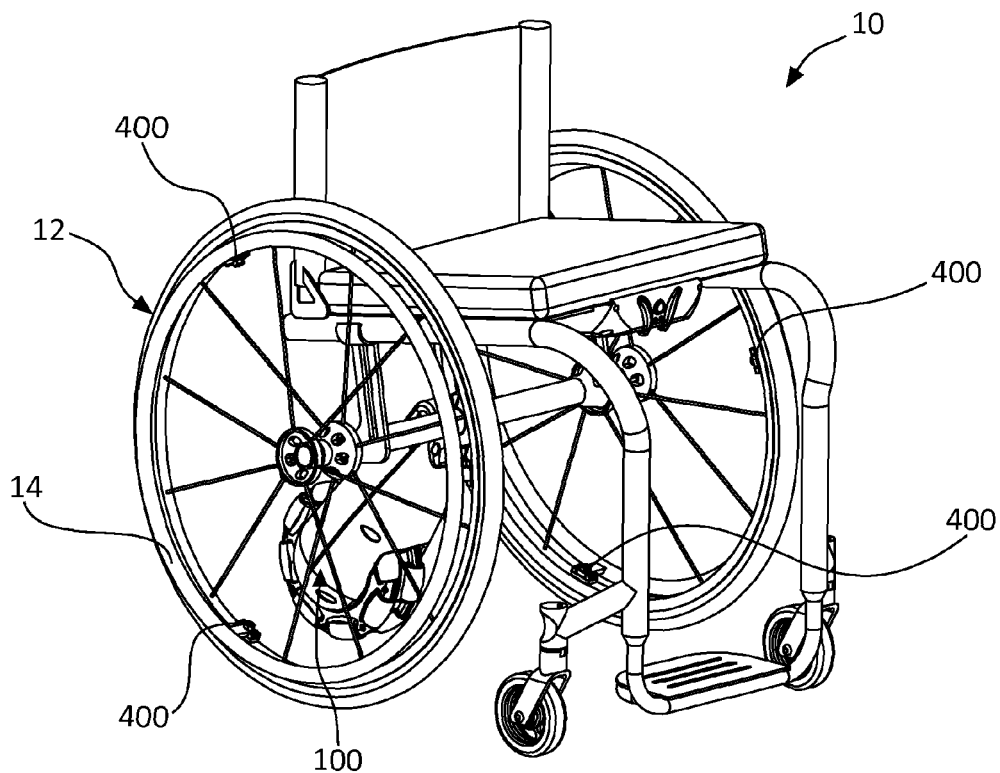
FIG. 10 shows a front angled view of a wheelchair equipped with a motion assistance system and a pushrim remote control.

In some embodiments, the motion assistance system 100 can be operated by a pushrim remote control. FIG. 10 shows an embodiment of a wheelchair 10 equipped with a motion assistance system 100 and a pushrim control 400, which can be, for example, a remote control. The pushrim control 400 can be attached to a wheel 12 of the wheelchair 10 in a complaint way to measure a forward push and rearward brake movement of the wheel 12.

Figure 11:
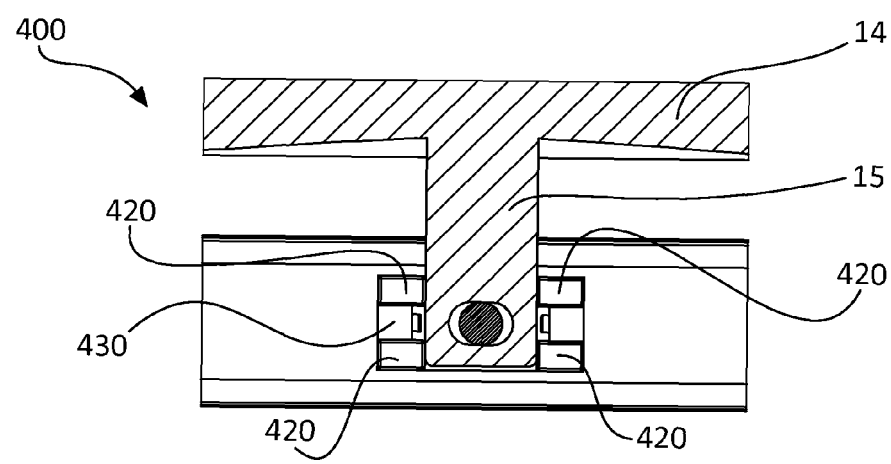
FIG. 11 shows a close up view of a pushrim remote control for use with a wheelchair.

FIG. 11 shows a pushrim control 400 on a pushrim 14 of a wheel 12 of a wheelchair 10. The pushrim control 400 is connected to a pushrim tab 15 of the wheelchair, and comprises complaint members 420, which can that bias the pushrim 14 to a neutral position. The pushrim control 400 can also include a switch 430, or a displacement or force sensor. In this manner the pushrim control 400 allows an operator to set the motor speed of the motion assistance system 100 based on the sensed forward push of the pushrim 14. The pushrim control 400 can operate based on the time of the push, the force of the push and/or the displacement of the wheel. For example, an operator can activate forward movement or forward acceleration by pushing the pushrims 14 forward, or activate a deceleration or a motor stop/shutoff by moving the pushrims 14 rearward.

Figure 12:
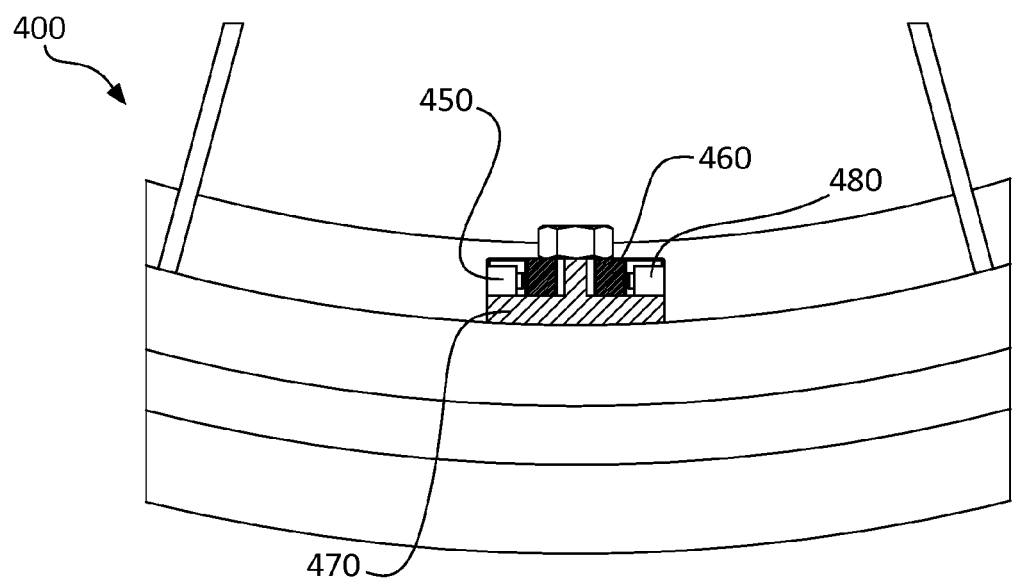
FIG. 12 shows a close up view of another pushrim remote control for use with a wheelchair.

FIG. 12 shows another view of the pushrim remote control 400. Here, the pushrim control 400 is configured to sense data transmitted wirelessly and or remotely to the drive unit 102 via bluetooth or other similar technology, for example. A wheelchair 10 employing the pushrim remote control 400 of FIG. 12 can include a battery and circuitry housed within sensor mounts, or in a single location with wires that connect the motor of a drive unit 102 to the sensors, for example. More specifically, FIG. 12 depicts a side view of a pushrim control 400. As shown, the pushrim control 400 involves a compliant member 450, an attachment fastener 470, and a pushrim tab 460 operating in connection with a sensor 480.

Figure 13:
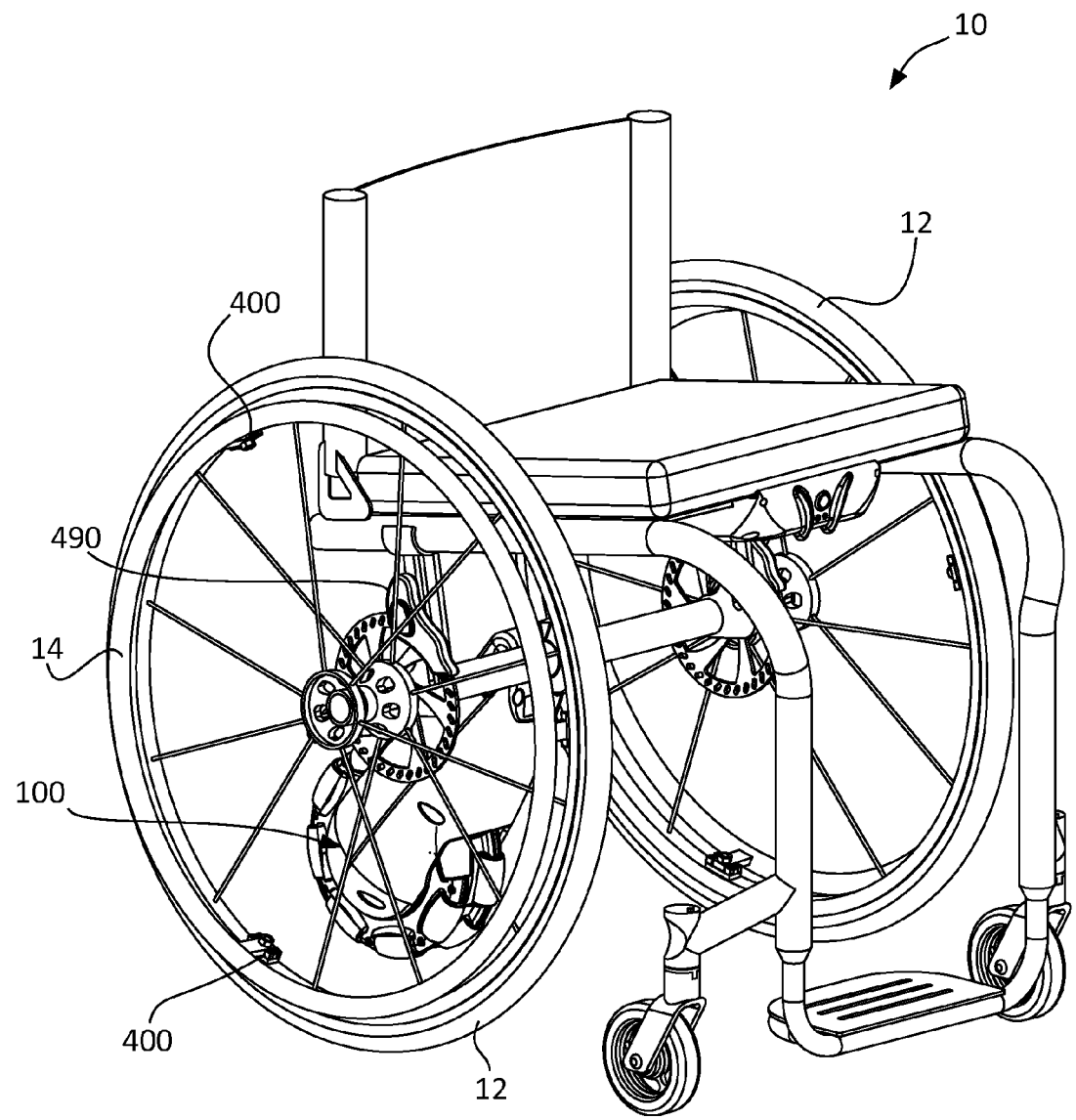
FIG. 13 shows a front angled view of a wheelchair equipped with a motion assistance system and remote brakes for turning the wheelchair.

FIG. 13 shows an embodiment of a wheelchair 10 equipped with a motion assistance system 100 and remote brakes 490 that assist in turning. The remote brakes 490 can be added to assist an operator with turning and/or braking the wheelchair 10. The remote brakes 490 can be connected to the motion assistance system 100 via a wireless technology, for example bluetooth technology. In this embodiment, a user can control the wheelchair 10 speed and direction using a control mechanism, such as a joystick (not shown). The joystick can be mounted to a structural element or the frame of a wheelchair 10 in a similar manner to the remote control shown in FIG. 7. The remote brakes 490 can be used in conjunction with the pushrim control 400 to amplify the turning force on the wheels. In certain embodiments, the remote brakes 490 can be activated by rearward braking, based on a brake time, a brake force, or a rearward displacement, for example. In certain embodiments, the remote brakes 490 can be turned off so that the system can operate like a standardized wheelchair.

Certain embodiments of the present technology also provide a motion assistance system that utilizes a mounting mechanism that is an expanding connector bar that is attachable and/or detachable to one or more structural elements of a wheelchair. FIG. 14 shows a rear angled view of a wheelchair 10 with the right wheel removed, the wheelchair equipped with a motion assistance system 100 attached by an expanding connector bar 500 mounting mechanism. Similarly, FIG. 15 shows a rear view of a wheelchair 10 having a motion assistance system 100 attached by an expanding connector bar 500. The expanding connector bar 500 can comprise a spring element or other compressible bar element that causes the connector bar 500 to generate an expanding force when the compressible bar is in a compressed position.

The expanding connector bar 500 can have connection elements 570 on the end of the bar that are adapted to connect, mate, interlock, connect with, or otherwise be held in place by structural elements of the wheelchair 10, or the wheelchair frame 70. The connector bar 500 can have connection elements 570 that are adapted to connect with and be held in place by corresponding elements located between the tips of quick release axles 80 of the wheelchair 10, for example. In this manner, the spring or compressible bar element of the connector bar 500 can exert an expanding force against each of the corresponding elements of the wheelchair 10. Similarly, to remove the motion assistance system, a user can compress the expanding connector bar 500, and remove the motion assistance system 100 from the wheelchair 10. In some embodiments, the motion assistance system 100 can be connected to, and disconnected from a battery 30, a wheelchair power source, and/or wheelchair control system via an electric power connector 21, for example.

The expanding connector bar 500 can also comprise a hand friction lock 510, which can be used to prevent the connector bar 500 from compressing when the motion assistance system 100 is installed on a wheelchair 10. For example, the friction lock 510 can be toggled into a locked position that prevents the connector bar 500 from compressing when the motion assistance system is in use, so that the motion assistance system 100 cannot separate from the wheelchair 10 during operation. The connector bar 500 can also comprise a semi-permanent adjustment lock 520, which may only be adjusted or toggled, for example, using a tool such as a key or a pin.

In certain embodiments, the expanding connector bar 500 serves as the mounting mechanism of the motion assistance system. The expanding connector bar 500 can also be attached or attachable to the drive unit 102, at an end location of the drive linkage 120, for example. In this manner, the motion assistance system 100 can be easily attached and detached from a wheelchair 10 for easy storage, transportation, and use. In some embodiments, the expanding connector bar 500 can be adapted to operate with a folding frame wheelchair, or a wheelchair that can be collapsed or compressed for storage and/or transport.

The present technology has now been described in such full, clear, concise and exact terms as to enable any person skilled in the art to which it pertains, to practice the same. It is to be understood that the foregoing describes preferred embodiments and examples of the present technology and that modifications may be made therein without departing from the spirit or scope of the invention as set forth in the claims. Moreover, it is also understood that the embodiments shown in the drawings, if any, and as described above are merely for illustrative purposes and not intended to limit the scope of the invention. As used in this description, the singular forms "a," "an," and "the" include plural reference such as "more than one" unless the context clearly dictates otherwise. Finally, all references cited herein are incorporated in their entirety.

The invention claimed is:

1. A motion assistance system for a wheelchair comprising:
  a mounting mechanism attachable to one or more structural elements of the wheelchair;
  a drive linkage having a hook that is detachably connected to said mounting mechanism such that said hook is pivotable with respect to the mounting mechanism;
  a drive wheel mounted to an end of the drive linkage such that the drive wheel contacts the ground when installed on the wheelchair, the drive wheel comprising a plurality of lateral rollers positioned radially about the circumference of the power drive wheel;
  wherein the lateral rollers are rotatable about an axis tangential to the circumference of the drive wheel.

2. The motion assistance system of claim 1, further comprising a motor for driving the drive wheel.

3. The motion assistance system of claim 2, further comprising a control switch for controlling the motor.

4. The motion assistance system of claim 3, wherein the control switch is a remote control.

5. The motion assistance system of claim 4, wherein the remote control comprises a wrist band and an activation button positioned at an inner wrist location on the wrist band.

6. The motion assistance system of claim 3, wherein the control switch is a pushrim control.

7. The motion assistance system of claim 2, wherein the lateral rollers facilitate lateral movement of the drive wheel.

8. The motion assistance system of claim 7, wherein the drive wheel can freely slide in a lateral direction while the motion assistance system drives the wheelchair forward, such that the motion assistance system can drive the wheelchair in a radial direction.

9. The motion assistance system of claim 1, wherein the drive wheel comprises two wheels, each wheel comprising a plurality of lateral rollers about the circumference of the wheel.

10. The motion assistance system of claim 1, further comprising a remote braking system.

11. The motion assistance system of claim 1, wherein the mounting mechanism is clamped to a support bar positioned between two rear wheels of the wheelchair, and wherein the drive linkage is pivotably attachable to the mounting mechanism.

12. The motion assistance system of claim 1, wherein the mounting mechanism comprises an expanding connector bar, and wherein the mounting mechanism is removably attachable to one or more structural elements of the wheelchair.

13. The motion assistance system of claim 12, wherein the mounting mechanism comprises a compressible bar element that generates an expanding force when the compressible bar is in a compressed position, and a lock that inhibits compression of the compressible bar.

14. The motion assistance system of claim 1, wherein said hook includes a clip that closes said hook off when said hook is connected to said mounting mechanism.

15. The motion assistance system of claim 1, wherein said hook is detachably connected to a bar on said mounting mechanism.

16. The motion assistance system of claim 1, wherein said mounting mechanism is configured to be attached to an axle of the wheelchair.

17. A motion assistance wheelchair comprising:
a wheelchair comprising a seat and at least two rear wheels;
a mounting mechanism attachable to a bar that is located between said rear wheels and that is generally parallel to a rotational axis of said rear wheels;
a drive linkage pivotable with respect to the mounting mechanism;
a drive wheel mounted to an end of the drive linkage such that the drive wheel contacts the ground when installed on the wheelchair, the drive wheel comprising a plurality of lateral rollers positioned radially about the circumference of the power drive wheel;
wherein the lateral rollers are rotatable about an axis tangential to the circumference of the drive wheel.

18. The wheelchair of claim 17, further comprising a motor for driving the drive wheel.

19. The wheelchair of claim 18, further comprising a remote control, the remote control comprising a wrist band and an activation button positioned at an inner wrist location on the wrist band.

20. The wheelchair of claim 17, wherein the bar to which said mounting mechanism is attached is the axle of said rear wheels.

21. The wheelchair of claim 17, wherein the bar to which said mounting mechanism is attached is an expanding connector bar.

22. The wheelchair of claim 21, wherein the wheelchair is a folding frame wheelchair.

23. A motion assistance system for driving a wheelchair comprising:
a mounting mechanism comprising an expanding connector bar, the mounting mechanism being removably attachable to a wheelchair at a location between two wheels of the wheelchair such that said connector bar is generally parallel to a rotational axis of the two wheels;
a drive linkage having a hook that is detachably connectable to said mounting mechanism such that said hook is pivotable with respect to the mounting mechanism; and
a drive wheel mounted to an end of the drive linkage such that the drive wheel contacts the ground when installed on the wheelchair, the drive wheel comprising a plurality of lateral rollers positioned radially about the circumference of the power drive wheel;
a motor for driving the drive wheel; and
a remote control for controlling the motor, the remote control comprising a wrist band and an activation button positioned at an inner wrist location of the wrist band;
wherein the lateral rollers are rotatable about an axis tangential to the circumference of the drive wheel to facilitate lateral movement of the drive wheel while driving the wheelchair forward.

\* \* \* \* \*